United States Patent
Spangler et al.

(10) Patent No.: US 10,774,657 B2
(45) Date of Patent: Sep. 15, 2020

(54) BAFFLE ASSEMBLY FOR GAS TURBINE ENGINE COMPONENTS

(71) Applicant: United Technologies Corporation, Farmington, CT (US)

(72) Inventors: Brandon W. Spangler, Vernon, CT (US); Dominic J. Mongillo, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 36 days.

(21) Appl. No.: 16/198,906

(22) Filed: Nov. 23, 2018

(65) Prior Publication Data

US 2020/0165921 A1    May 28, 2020

(51) Int. Cl.
     *F01D 5/18*    (2006.01)

(52) U.S. Cl.
     CPC ........ *F01D 5/188* (2013.01); *F05D 2260/201* (2013.01)

(58) Field of Classification Search
     CPC ..... F01D 5/188; F01D 5/189; F05D 2260/201
     See application file for complete search history.

(56) References Cited

U.S. PATENT DOCUMENTS

| | | |
|---|---|---|
| 3,966,357 A | 6/1976 | Corsmeier |
| 4,474,532 A | 10/1984 | Pazder |
| 6,193,465 B1 | 2/2001 | Liotta et al. |
| 6,554,563 B2 | 4/2003 | Noe et al. |
| 6,589,010 B2 | 7/2003 | Itzel et al. |
| 6,939,102 B2 | 9/2005 | Liang |
| 7,137,784 B2 | 11/2006 | Hall et al. |
| 8,109,724 B2 | 2/2012 | Malecki et al. |
| 8,152,468 B2 | 4/2012 | Propheter-Hinckley et al. |
| 9,328,618 B2 | 5/2016 | Grohens |
| 9,458,767 B2 | 10/2016 | Farrell |

(Continued)

FOREIGN PATENT DOCUMENTS

| | | |
|---|---|---|
| WO | 2012019975 | 2/2012 |
| WO | 2014126674 | 8/2014 |

(Continued)

OTHER PUBLICATIONS

European Search Report for European Patent Application No. 16183718.2 completed Dec. 12, 2016.

*Primary Examiner* — Richard A Edgar
(74) *Attorney, Agent, or Firm* — Carlson, Gaskey & Olds, P.C.

(57) ABSTRACT

An airfoil for a gas turbine engine according to an example of the present disclosure includes, among other things, an airfoil section extending from a first platform section. The airfoil section defines an internal core cavity for conveying a fluid flow, and a baffle assembly that has a first baffle and a second baffle. The first baffle includes a first baffle body extending in the internal core cavity. The first baffle body defines an internal baffle cavity. The second baffle includes a second baffle body dimensioned to extend from the platform section into the internal baffle cavity such that an outer periphery surface of the second baffle body and an external wall of the airfoil section cooperate to define a first cooling passage that directs cooling flow into the internal baffle cavity.

20 Claims, 14 Drawing Sheets

(56) References Cited

U.S. PATENT DOCUMENTS

| | | |
|---|---|---|
| 9,988,913 B2 | 6/2018 | Spangler |
| 10,012,106 B2 | 7/2018 | Spangler et al. |
| 2007/0048136 A1 | 3/2007 | Boury et al. |
| 2008/0317585 A1 | 12/2008 | Lee et al. |
| 2009/0246023 A1 | 10/2009 | Chon et al. |
| 2010/0054915 A1 | 3/2010 | Devore et al. |
| 2010/0124485 A1 | 5/2010 | Tibbott |
| 2011/0031036 A1 | 2/2011 | Patel |
| 2012/0034100 A1 | 2/2012 | Malecki et al. |
| 2013/0052008 A1 | 2/2013 | Spangler |
| 2013/0223987 A1 | 8/2013 | Stafford et al. |
| 2015/0226085 A1 | 8/2015 | Spangler et al. |
| 2015/0345397 A1 | 12/2015 | Bunker |
| 2016/0076483 A1 | 3/2016 | Jasper |
| 2017/0037732 A1 | 2/2017 | Spangler |
| 2017/0175578 A1* | 6/2017 | Propheter-Hinckley ................... F01D 9/02 |
| 2017/0234151 A1 | 8/2017 | Spangler et al. |

FOREIGN PATENT DOCUMENTS

| | | |
|---|---|---|
| WO | 2015023338 | 2/2015 |
| WO | 2015030926 | 3/2015 |

\* cited by examiner

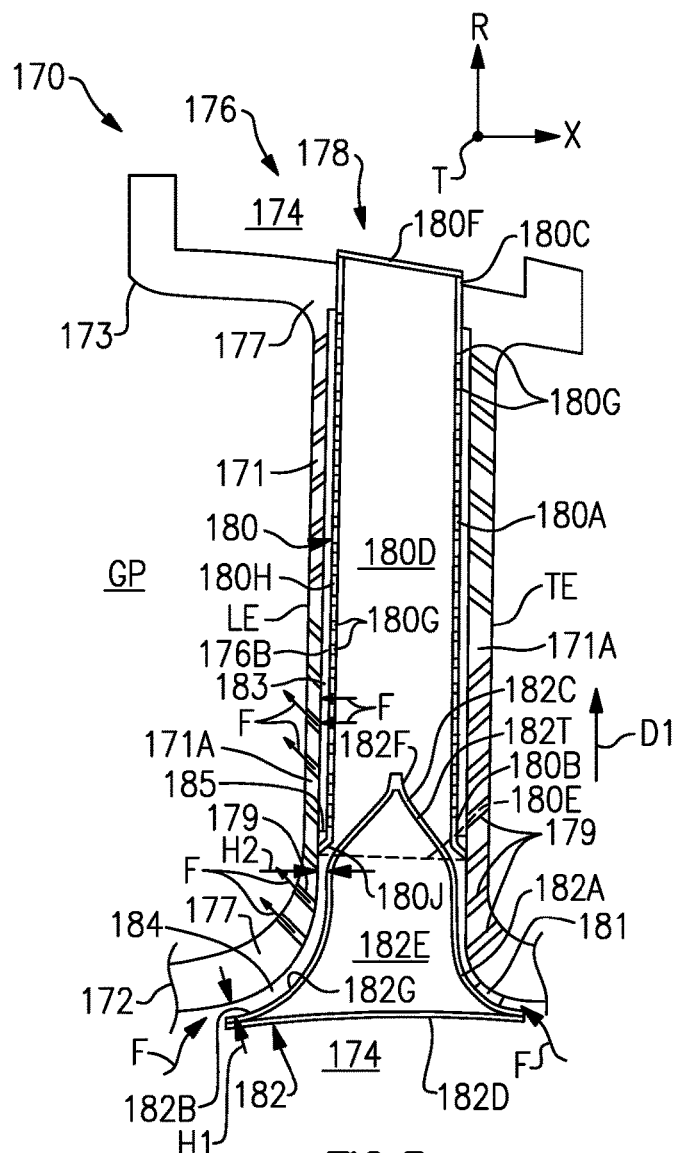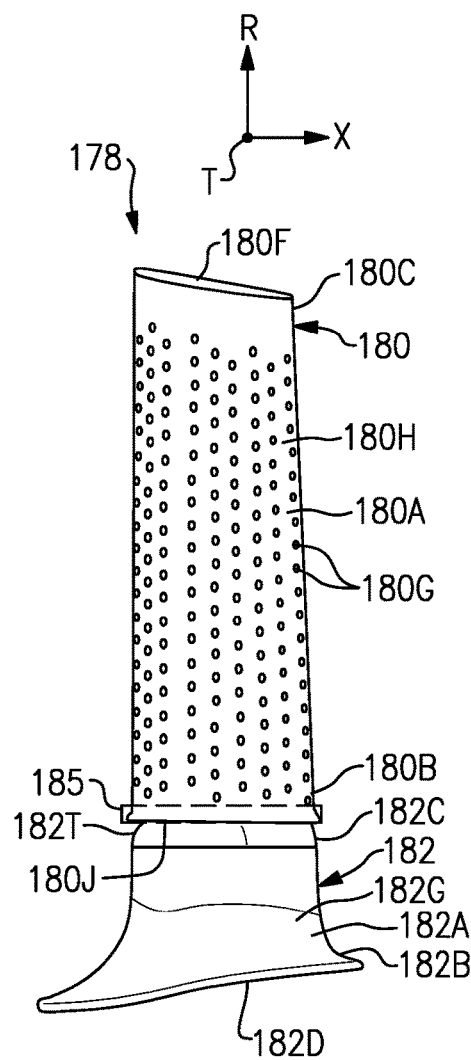
FIG.5
FIG.6

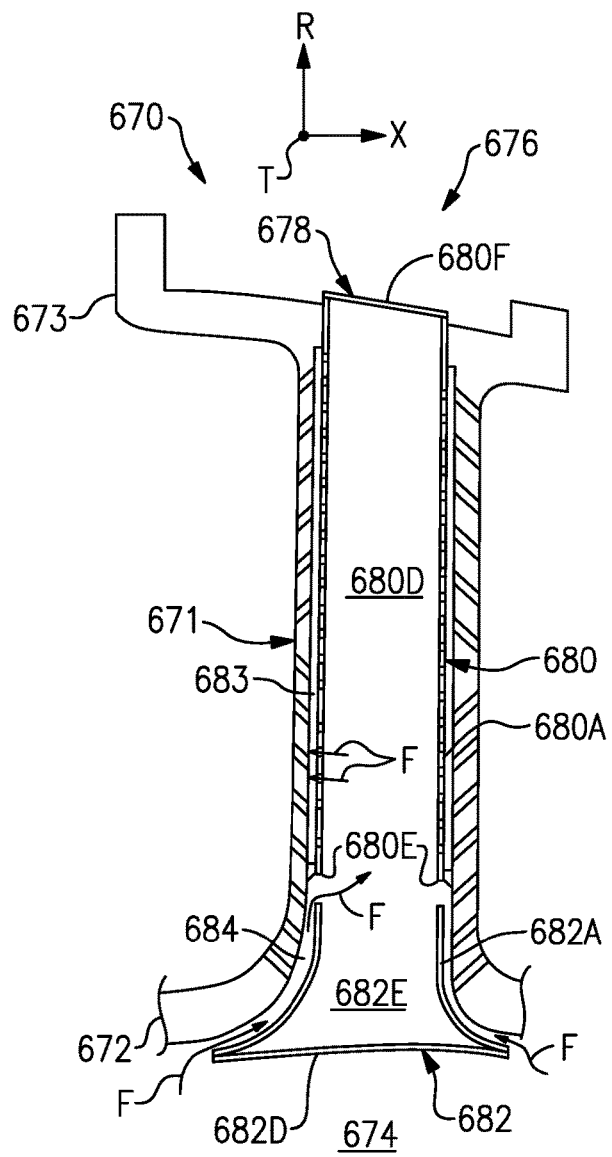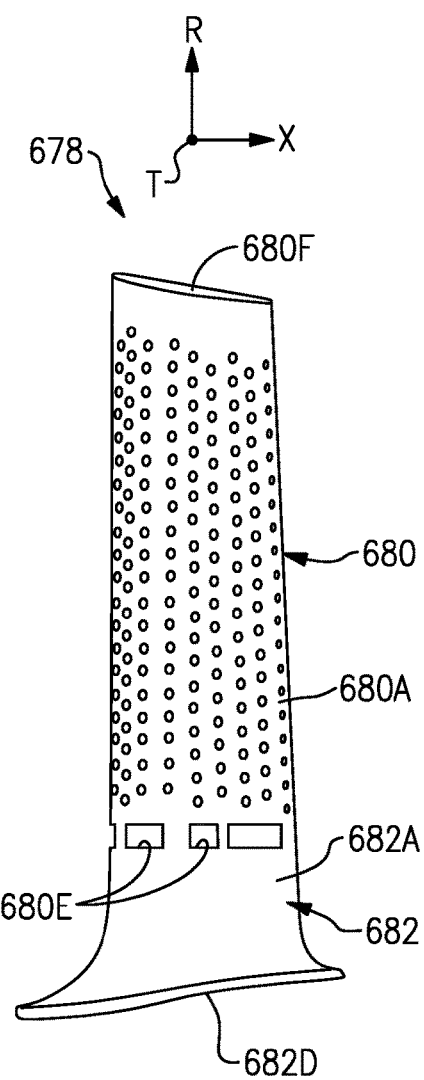
FIG.14
FIG.15

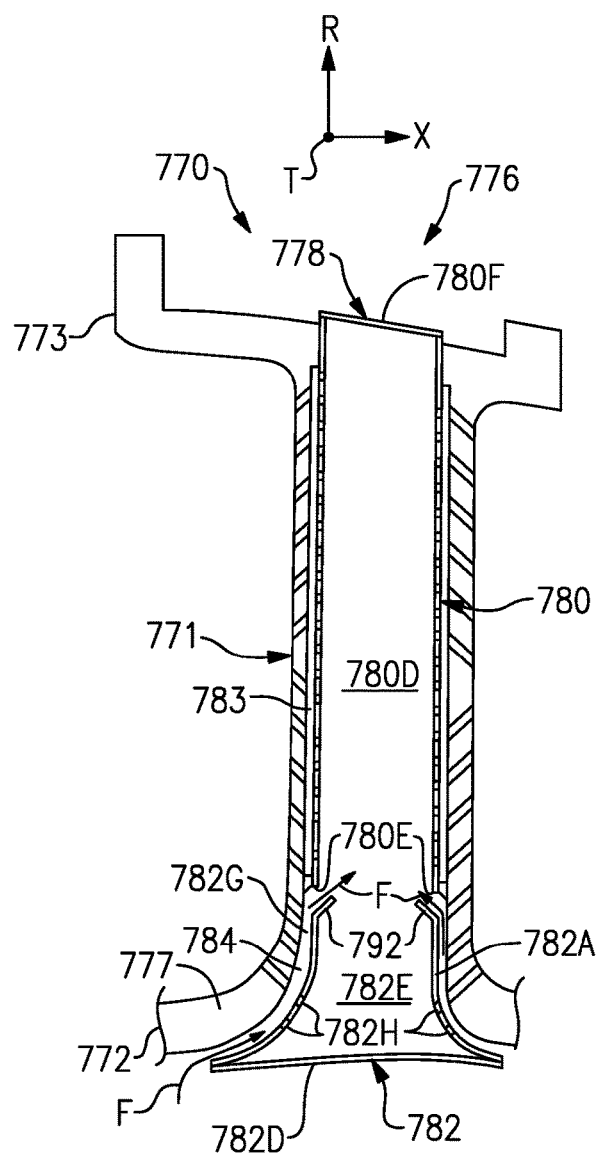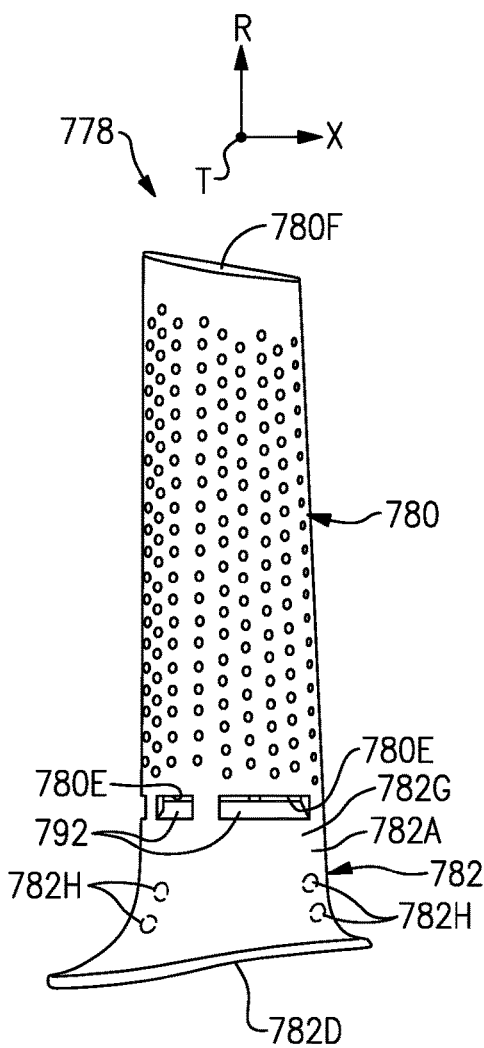
FIG.17
FIG.18

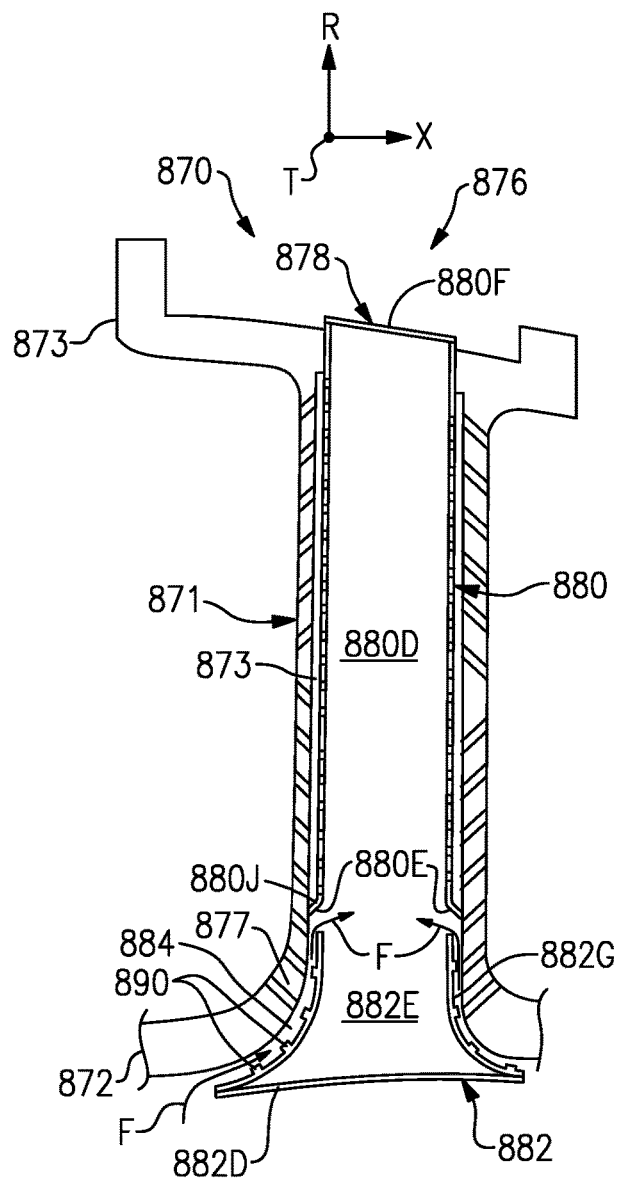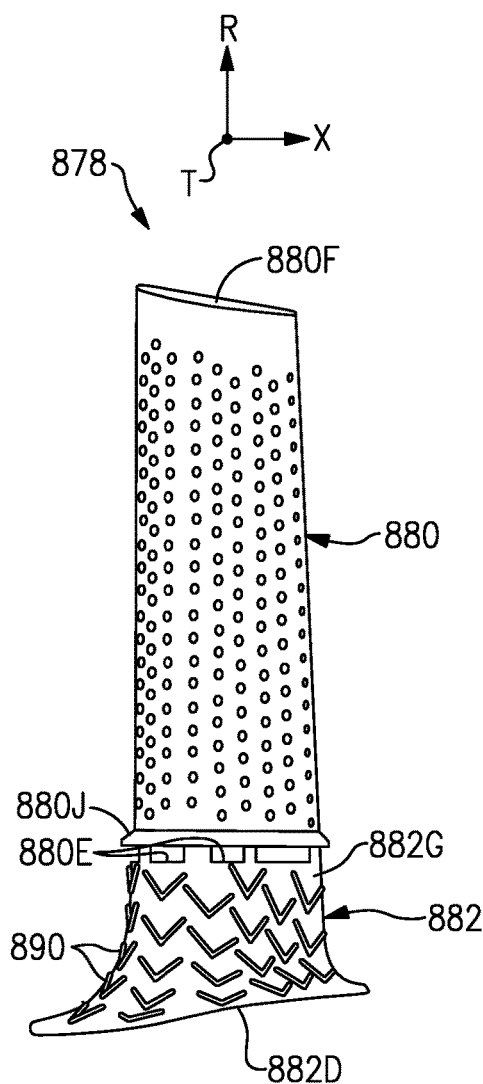
FIG.20
FIG.21

BAFFLE ASSEMBLY FOR GAS TURBINE ENGINE COMPONENTS

BACKGROUND

This disclosure relates to directing fluid flow and cooling components of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

Some blades and vanes may include a baffle that directs cooling flow in the cooling scheme.

SUMMARY

An airfoil for a gas turbine engine according to an example of the present disclosure includes an airfoil section extending from a first platform section. The airfoil section defines an internal core cavity for conveying a fluid flow, and a baffle assembly that has a first baffle and a second baffle. The first baffle includes a first baffle body extending in the internal core cavity. The first baffle body defines an internal baffle cavity. The second baffle includes a second baffle body dimensioned to extend from the platform section into the internal baffle cavity such that an outer periphery surface of the second baffle body and an external wall of the airfoil section cooperate to define a first cooling passage that directs cooling flow into the internal baffle cavity.

In a further embodiment of any of the foregoing embodiments, the first baffle is an impingement baffle including a plurality of apertures oriented to eject cooling flow from the internal baffle cavity onto surfaces defining the internal core cavity.

In a further embodiment of any of the foregoing embodiments, the first baffle is dimensioned to establish an impingement cavity between the first baffle body and the external wall of the airfoil section, and the external wall defines a plurality of film cooling apertures that extend outwardly from the impingement cavity.

In a further embodiment of any of the foregoing embodiments, the first baffle body extends from an annular baffle collar dimensioned to establish a sealing relationship along a perimeter of the internal core cavity to fluidly isolate the first cooling passage and the impingement cavity.

In a further embodiment of any of the foregoing embodiments, the second baffle body extends between first and second end portions of the second baffle, and the second baffle body tapers from the first end portion to define an apex received in the internal baffle cavity.

A further embodiment of any of the foregoing embodiments includes a transition section interconnecting the external wall of the airfoil section and the first platform section, the transition section defining a plurality of film cooling apertures that extend outwardly from the first cooling passage.

In a further embodiment of any of the foregoing embodiments, the second baffle body includes a plurality of heat transfer features along the first cooling passage.

In a further embodiment of any of the foregoing embodiments, the airfoil section extends in a radial direction between the first platform section and a second platform section.

In a further embodiment of any of the foregoing embodiments, the second baffle is spaced apart from the second platform section, and the first baffle body is at least partially received in the second platform section.

In a further embodiment of any of the foregoing embodiments, the internal core cavity extends between opposed first and second openings. The second baffle body extends through the first opening. A third baffle has a third baffle body that extends from the second platform section, through the second opening and into the internal baffle cavity such that an outer periphery surface of the third baffle body and the external wall of the airfoil section cooperate to define a second cooling passage that directs cooling flow into the internal baffle cavity.

A baffle assembly for a gas turbine engine according to an example of the present disclosure includes a first baffle that has a first baffle body defining an internal baffle cavity that extends between opposed first and second end portions of the first baffle body. The first baffle body defines a plurality of impingement apertures distributed about an outer periphery surface of the first baffle body and defining a first opening along the first end portion. A second baffle has a second baffle body having a first tapered portion that is dimensioned to extend through the first opening and into the internal baffle cavity.

In a further embodiment of any of the foregoing embodiments, the first baffle body is dimensioned to establish an impingement cavity between the outer periphery surface of the first baffle body and an external wall of an airfoil section of an airfoil, and the second baffle body is dimensioned to establish a first cooling passage between the outer periphery surface of the second baffle body and a fillet portion between the airfoil section and a platform section.

In a further embodiment of any of the foregoing embodiments, the internal baffle cavity extends between the first opening and a second opening defined in the second end portion. A third baffle has a third baffle body having a third tapered portion that is dimensioned to extend through the second opening and into the internal baffle cavity such that the third tapered portion opposes the first tapered portion.

A gas turbine engine according to an example of the present disclosure includes a rotatable blade spaced axially from a vane. At least one of the blade and the vane has an airfoil section extending from a first platform section and includes a baffle assembly. The airfoil section defines an internal core cavity for conveying a fluid flow. The baffle assembly includes a first baffle that has a first baffle body extending in the internal core cavity. The first baffle body defines an internal baffle cavity. An annular collar extends about an outer periphery surface of the first baffle body, and a second baffle has a second baffle body dimensioned to extend from the platform section into the airfoil section such that an outer periphery surface of the second baffle body and an external wall of the airfoil section cooperate to define a first cooling passage that directs cooling flow along the collar and into the internal baffle cavity.

In a further embodiment of any of the foregoing embodiments, the first baffle is dimensioned to establish an impingement cavity between the first baffle body and the external wall of the airfoil section, and the first baffle body defines a plurality of apertures about the outer periphery surface of the first baffle body that interconnect the internal baffle cavity and the impingement cavity.

In a further embodiment of any of the foregoing embodiments, the collar is dimensioned to extend between the external wall and the first baffle body to fluidly isolate the first cooling passage and the impingement cavity.

In a further embodiment of any of the foregoing embodiments, the first and second baffles are separate and distinct components, and the second baffle body is dimensioned to extend from the platform section into the internal baffle cavity.

A further embodiment of any of the foregoing embodiments includes a plurality of slots defined between the first and second baffle bodies that interconnect the first cooling passage and the internal baffle cavity.

A further embodiment of any of the foregoing embodiments includes a plurality of tabs sloping inwardly from the outer periphery surface of the second baffle body such that the tabs are oriented to direct cooling flow from the slots in a direction away from the second baffle body and toward the internal baffle cavity.

A further embodiment of any of the foregoing embodiments includes a fillet portion interconnecting the external wall of the airfoil section and the first platform section, the fillet portion defining a plurality of film cooling apertures that extend outwardly from the first cooling passage.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 5 illustrates a sectional view of the component along line 5-5 of FIG. 4.

FIG. 6 illustrates an isolated view of the baffle assembly of FIG. 4.

FIG. 14 illustrates a sectional view of the component along line 14-14 of FIG. 13.

FIG. 15 illustrates an isolated view of the baffle assembly of FIG. 13.

FIG. 16 illustrates a partially cutaway view of a gas turbine component including a baffle assembly according to an example.

FIG. 17 illustrates a sectional view of the component along line 17-17 of FIG. 16.

FIG. 18 illustrates an isolated view of the baffle assembly of FIG. 16.

FIG. 20 illustrates a sectional view of the component along line 20-20 of FIG. 19.

FIG. 21 illustrates an isolated view of the baffle assembly of FIG. 19.

DETAILED DESCRIPTION

Figure 1:
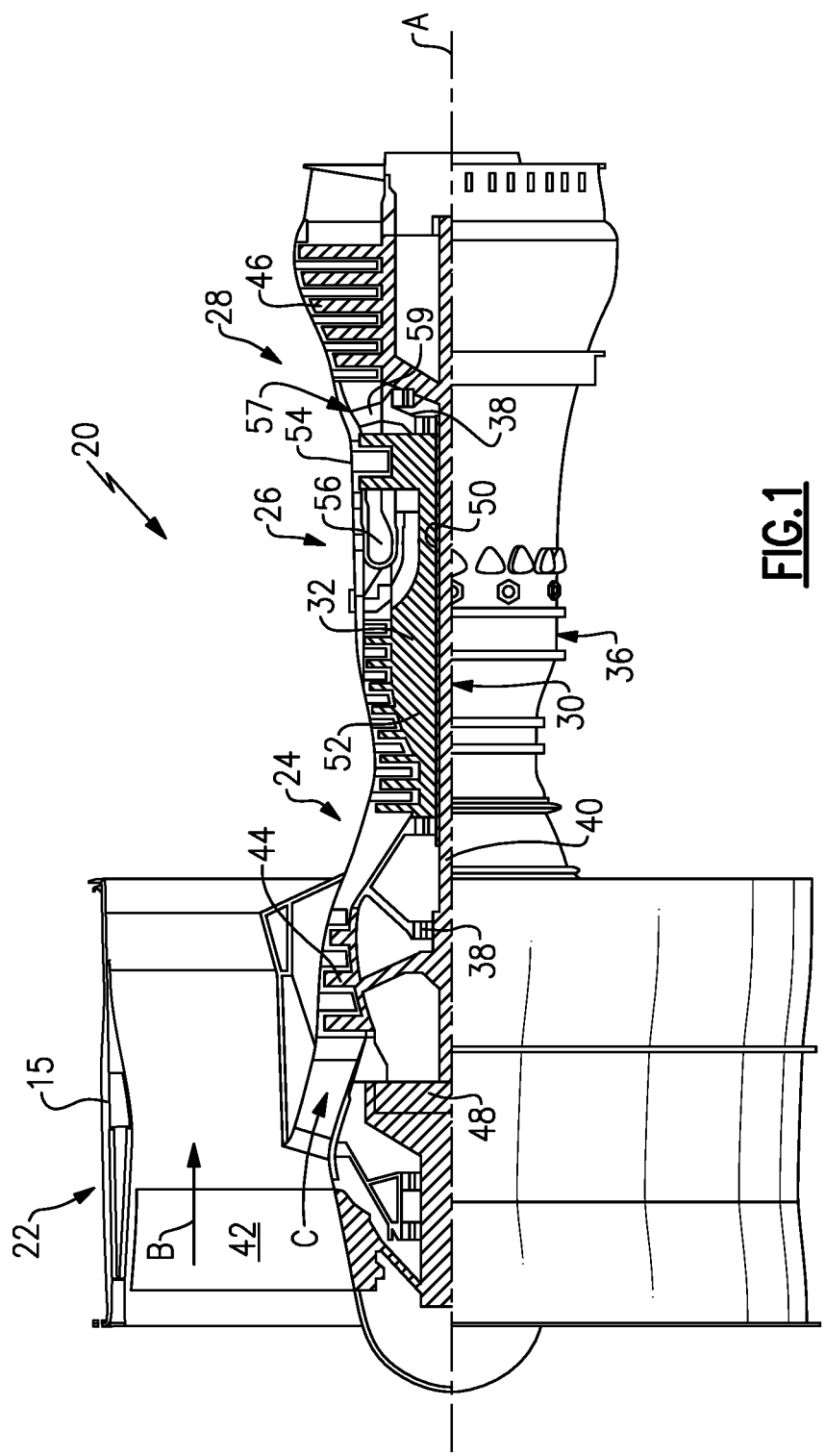
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
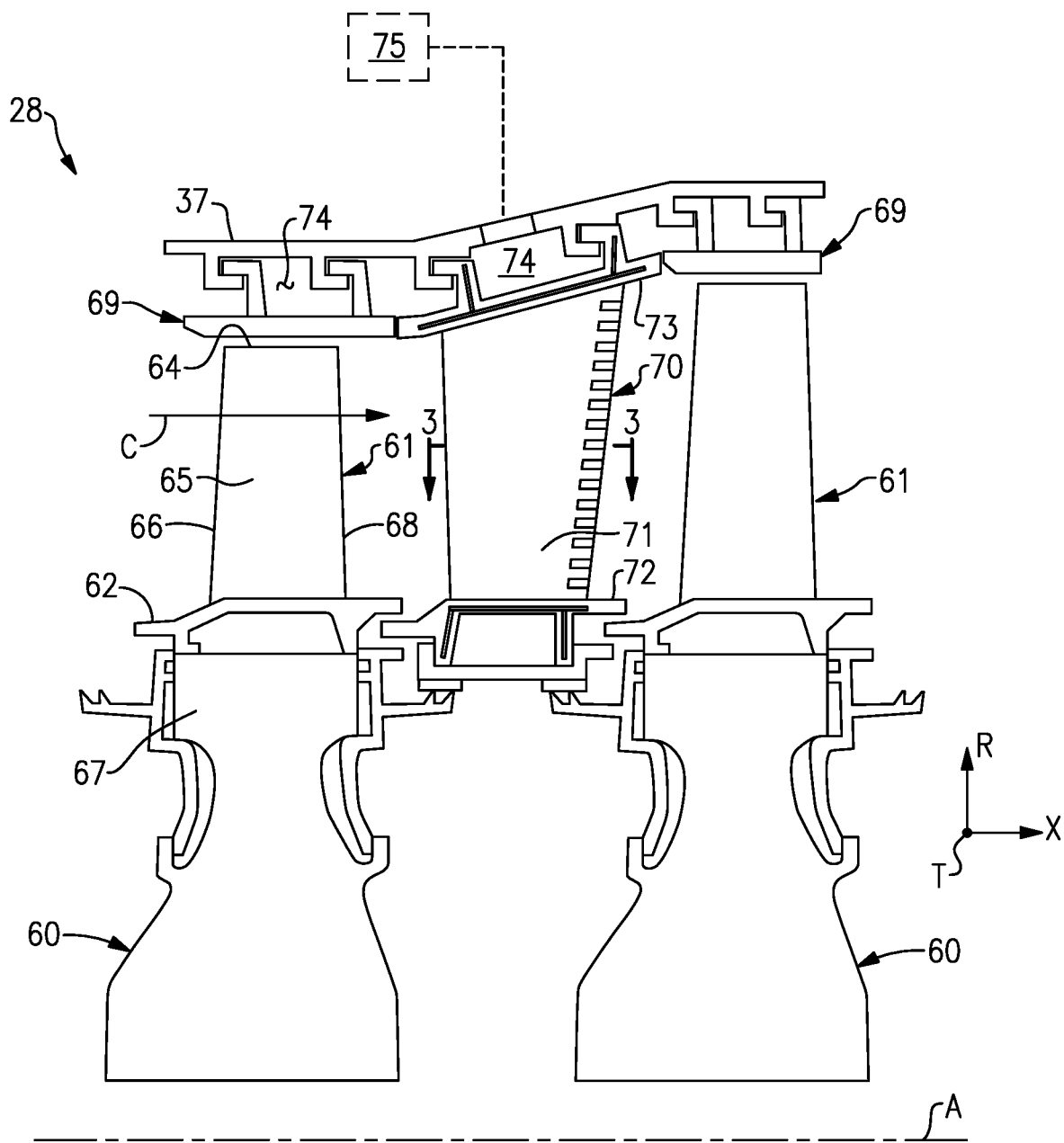
FIG. 2 schematically shows an airfoil arrangement for a turbine section.

FIG. 2 shows selected portions of the turbine section 28 including a rotor 60 carrying one or more blades or airfoils 61 that are rotatable about the engine axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 60. A blade outer air seal (BOAS) 69 is spaced radially outward from the tip 64 of the airfoil section 65. The BOAS 69 can include a plurality of seal arc segments that are circumferentially arranged in an annulus around the engine axis A. An array of the BOAS 69 are distributed about an array of the airfoils 61 to bound the core flow path C.

A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS 69 arranged circumferentially about the engine axis A.

One or more cooling sources 75 (one shown) are configured to provide cooling air to one or more cooling cavities or plenums 74 defined by an engine static structure such as the engine case 37 or another portion of the engine static structure 36 (FIG. 1). The engine case 37 extends along the engine axis A. In the illustrated example of FIG. 2, the plenums 74 are defined between an engine case 37 and the outer platform 73 and/or BOAS 69. The plenums 74 are configured to receive pressurized cooling flow from the cooling source(s) 75 to cool portions of the airfoil 61, BOAS 69 and/or vane 70. Cooling sources 75 can include bleed air from an upstream stage of the compressor section 24 (FIG. 1), bypass air, or a secondary cooling system aboard the aircraft, for example. Each of the plenums 74 can extend in a circumferential or thickness direction T between adjacent airfoils 61, BOAS 69 and/or vanes 70. The tips 64 of each of the airfoil sections 65 and adjacent BOAS 69 are in close radial proximity to reduce the amount of gas flow that is redirected toward and over the rotating blade airfoil tips 64 through a corresponding clearance gap.

Figure 3:
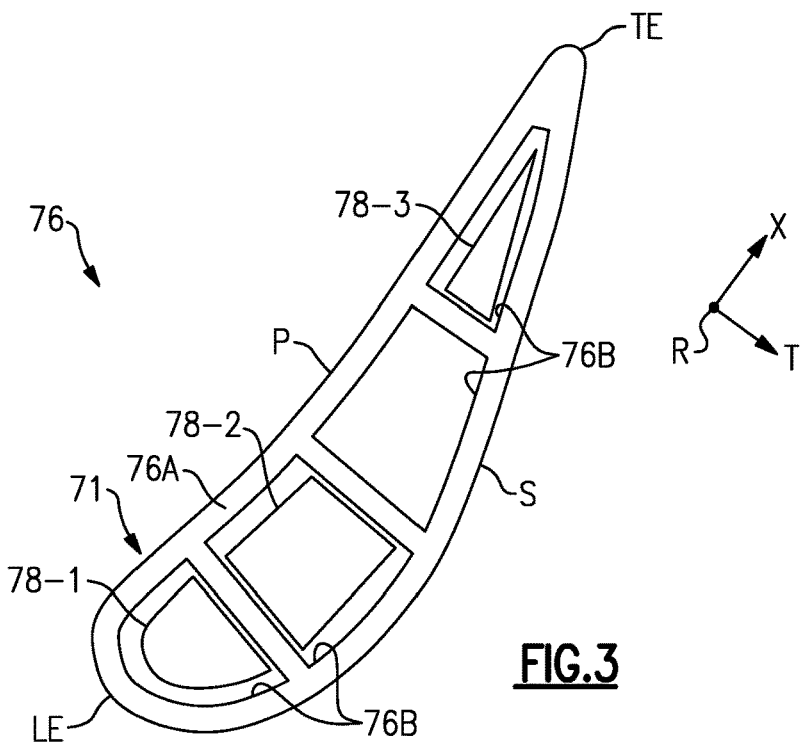
FIG. 3 illustrates a cooling scheme for an airfoil section taken along line 3-3 of FIG. 2.

FIG. 3 illustrates a cooling scheme 76 for airfoil section 71 of FIG. 2. The airfoil section 71 includes an airfoil body 76A that extends between leading and trailing edges LE, TE in an axial or chordwise direction X and that extends in a thickness direction T between pressure and suction side surfaces P, S. Although cooling scheme 76 is illustrated with respect to airfoil section 71 of vane 70, it should be appreciated that the cooling scheme can be incorporated into the airfoil section 65 of FIG. 2. The airfoil body 76A defines one or more internal cooling cavities or passages 76B that communicate with cooling source 75 (FIG. 2). The passages 76B convey a fluid flow such as cooling air from the cooling source 75 to cool adjacent portions of the airfoil body 76A.

The cooling scheme 76 includes one or more baffle assemblies 78 (indicated at 78-1 to 78-3). Each baffle assembly 78 can be at least partially received in a respective one of the passages 76B. For example, baffle assembly 78-1 can be situated adjacent to leading edge LE, and baffle assembly 78-3 can be situated adjacent to trailing edge TE. Baffle assembly 78-2 can be situated in a passage 76B that is spaced apart from the leading and trailing edges LE, TE. Each baffle assembly 78 is dimensioned to direct cooling flow from the cooling source 75 to localized portions of the airfoil 65/71.

Figure 4:
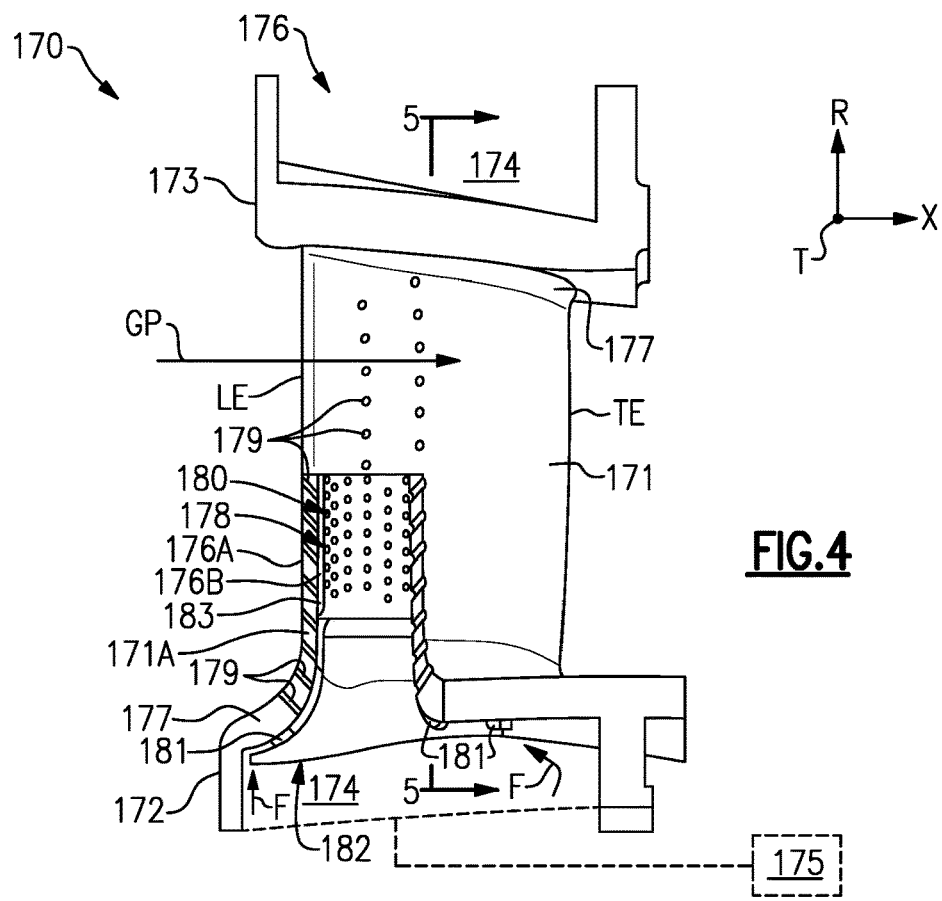
FIG. 4 illustrates a partially cutaway view of a gas turbine component including a baffle assembly.

FIGS. 4-6 illustrate a baffle assembly 178 for a gas turbine engine component according to an example. In the illustrated example of FIGS. 4-5, the baffle assembly 178 is incorporated in a cooling scheme 176 of the gas turbine engine component. The component is a vane 170 which can be incorporated into a portion of a gas turbine engine such as turbine section 28 of FIGS. 1-2, for example. Although the disclosure primarily refers to the component being a vane 170, other components can be benefit from the teachings herein, including the rotatable blades or airfoils 61 and BOAS 69 of FIG. 2, as well as combustor liners or panels in the combustor section 26 of FIG. 1. Other systems can also benefit from the teachings disclosed herein, including land-based turbines and other systems in which cooling schemes are utilized.

Referring to FIGS. 4 and 5, the vane 170 includes an airfoil section 171 extending in a radial direction R between an inner (or first) platform section 172 and an outer (or second) platform section 173. The vane 170 includes transition sections 177 that interconnect external walls 171A of the airfoil section 171 and the platform sections 172, 173. Each transition section 177 is a fillet portion that tapers between the respective platform sections 172, 173 and external walls 171A to define an aerodynamic contour for guiding hot combustion gases in a gas path GP across external surfaces of the vane 170.

Each platform section 172, 173 defines a respective cooling cavity or plenum 174 that is in fluid communication with the cooling source 175 (shown in dashed lines in FIG. 4 for illustrated purposes). The airfoil section 171 defines at least one internal core cavity 176B for conveying a fluid flow F from the cooling source 175. Each plenum 174 can be dimensioned to convey the cooling flow F to adjacent portions of the internal core cavity 176B. Although the illustrated example of FIGS. 4 and 5 illustrate a single internal core cavity 176B, it should be appreciated that the cooling scheme 176 can be utilized with more than one internal core cavity 176B according to the teachings disclosed herein.

The external walls 171A and/or transition section 177 can define one or more apertures 179 which provide a protective insulating film cooling boundary to localized portions of the vane 170. In the illustrated examples of FIGS. 4 and 5, the apertures 179 are film cooling holes that extend outwardly to eject or discharge the cooling flow F to provide film cooling over the external airfoil and platform surfaces of the vane 170.

Referring to FIGS. 5 and 6, with continued reference to FIG. 4, the baffle assembly 178 includes a first baffle 180 and a second baffle 182 that are arranged to direct cooling flow F to localized portions of the vane 170. The first baffle 180 includes a first baffle body 180A that extends between opposed end portions 180B, 180C. One of the end portions 180C can be received in and secured to the outer platform section 173. The first baffle body 180A is dimensioned to extend in the radial direction R toward the inner platform section 172 such that the first baffle body 180A is at least partially received in the internal core cavity 176B. It should be understood that an opposite arrangement can be utilized such that the end portion 180C is received in the inner platform section 172 and extends radially towards the outer platform section 173.

As illustrated by FIG. 5, the first baffle body 180A is hollow and defines an internal baffle cavity 180D that extends between the end portions 180B, 180C. The first baffle body 180A defines a first opening 180E (shown in dashed lines for illustrative purposes) along end portion 180B for conveying cooling flow F into the internal baffle cavity 180D. The first baffle 180 can include a cover plate 180F that seals the second end portion 180C. In the illustrated example, cover plate 180F is substantially free of any apertures to reduce leakage of cooling flow from the internal baffle cavity 180D. In other examples, the cover plate 180F includes aperture(s) to communicate flow from the internal baffle cavity 180D to the plenum 174 defined by the second platform section 173.

The first baffle 180 is an impingement baffle that is dimensioned to establish an impingement cavity 183. The impingement cavity 183 extends between an outer periphery surface 180H of the first baffle body 180A and external walls 171A of the airfoil section 171. The apertures 179 extend outwardly from the impingement cavity 183.

The first baffle body 180A defines a plurality of impingement apertures 180G distributed about the outer periphery surface 180H that interconnect the internal baffle cavity 180D and impingement cavity 183. Each impingement aperture 180G includes an axis that is oriented to intersect surfaces defining the impingement cavity 183 such that the aperture 180G eject or discharges cooling flow F from the internal baffle cavity 180D onto the internal surfaces of the external walls 171A defining the impingement cavity 183.

The first baffle body 180A extends from an annular baffle collar 180J along the first end portion 180B. The baffle collar 180J can be dimensioned to extend about the outer periphery surface 180H of the first baffle body 180A. The baffle collar 180J is dimensioned to extend between the external walls 171A and first baffle body 180A and to establish a sealing relationship along a perimeter of the internal core cavity 176B to fluidly isolate the impingement cavity 183 from a first cooling passage 184. The first cooling passage 184 interconnects the cooling plenum 174 and internal baffle cavity 180D, as illustrated by FIG. 5. One or more of the film cooling apertures 179 can extend outwardly from the first cooling passage 184 to provide convective and/or film cooling along external surfaces of the transition section 177. The baffle collar 180J can reduce stresses along walls of the internal core cavity 176B that may otherwise result by incorporation of sealing ribs or other abrupt and/or discrete discontinuous internal geometry features that may produce local stress concentrations in order to provide necessary effective sealing capability.

The baffle collar 180J is dimensioned to integrate or otherwise cooperate with an annular standoff collar 185 (shown in dashed lines in FIG. 6 for illustrated purposes). The standoff collar 185 extends about the perimeter of the internal core cavity 176B. The standoff collar 185 can be dimensioned to extend about the outer periphery surface 180H of the first baffle body 180A when the first baffle 180 is in an installed position.

The standoff collar 185 is contoured to mate with a geometry of the baffle collar 180J and is seated against the baffle collar 180J to establish the sealing relationship. In the illustrated examples of FIGS. 5 and 6, the collars 180J, 185 are separate and distinct components. The standoff collar 185 can serve to provide weld surfaces for mechanically attaching or otherwise securing the baffle collar 180J to secure and position the first baffle 180 in the internal core cavity 176B. In other examples, the collars 180J, 185 are portions of a single component utilized to mechanically attach the external walls 171A and first baffle body 180A.

The second baffle 182 includes a second baffle body 182A that extends between opposed first and second end portions 182B, 182C. The second baffle 182 can be a space-eater baffle that has a hollow cavity 182E (FIG. 5) defined within the second baffle body 182A. The second baffle 182 includes a cover plate 182D mechanically attached to the first end portion 182B to bound the hollow cavity 182E. The second baffle 182 may be substantially or completely free of any apertures when in an assembled position such that communication of fluid flow F within the hollow cavity 182E is eliminated or otherwise reduced. For the purposes of this disclosure, the term "substantially free" means less than 1% of a total external surface area of the respective component unless otherwise indicated. In other examples, a volume of the second baffle body 182A is occupied by material such that the hollow cavity 182E is omitted.

The second baffle 182 can be situated in the plenum 174 and portions of the internal core cavity 176B to reduce an effective volume therein. The second baffle body 182A is dimensioned such that the second baffle 182 is spaced apart from the second platform section 173 and extends only partially into the internal core cavity 176B of the airfoil section 171. The second baffle 182 is arranged to direct cooling flow F for convectively cooling localized portions of the vane 170 including the transition section 177 and other surfaces defining the internal core cavity 176B and plenum 174. The arrangement of the second baffle 182 can increase an amount of cooling flow F that circulates across surfaces of the transition section 177, which can improve the local convective heat transfer and thermal cooling efficiency.

The first and second baffles 180, 182 can be separate and distinct components. As illustrated by FIG. 5, the second baffle 182 has a generally bell-shaped cross-sectional geometry. The first baffle 180 is dimensioned to radially overlap with the second baffle 182 when in an installed position. The second baffle body 182A has a first tapered portion 182T that is dimensioned to extend through the first opening 180E and into the internal baffle cavity 180D. The first tapered portion 182T tapers radially from the first end portion 182B to the second end portion 182C to define an apex 182F that is dimensioned to be received in the internal baffle cavity 180D.

The second baffle body 182A is dimensioned to extend from the platform section 172 into the internal baffle cavity 180D such that an outer periphery surface 182G of the second baffle body 182A assimilates or otherwise cooperates with the transition section 177 and external walls 171A of the airfoil section 171 to define the first cooling passage 184. The first cooling passage 184 directs or otherwise conveys cooling flow F along the internal surfaces of the transition section 177, along the baffle collar 180J and into the internal baffle cavity 180D.

The first cooling passage 184 has a cavity or channel height defined by the second baffle body 182A and the external wall 171A, including a first cooling passage channel height H1 at an inlet portion of the first cooling passage 184 and a second cooling passage channel height H2 at an exit portion of the first cooling passage 184. The channel height can be constant along a length of the first cooling passage 184 such that the first cooling passage 184 has a constant flow area and/or maintains a uniform distance or offset from the internal wall surface of the external walls 171A in the streamwise flow direction of the cooling flow F throughout the transition section 177. Alternatively, the first cooling passage channel height H1 at the inlet portion may differ from the passage channel height H2. For example, the channel height H1 may be greater than the channel height H2, resulting in the first cooling passage 184 having a converging flow area throughout the transition section 177. Conversely, the channel height H1 may be less than the channel height H2, resulting in the first cooling passage 184 having a diverging flow area throughout the transition section 177. The uniformity and/or non-uniformity of the first cooling passage 184 flow area may be tailored with respect to a predefined distribution of backside internal convective heat transfer, total pressure loss, and static pressure variation within the first cooling passage 184.

It is also understood that the passage channel heights H1 and H2 can vary both in a radial direction R and circumferential C throughout the transition regions 177 depending on the local external gas path heat flux and thermal-mechanical strain distributions. The ability to better control the local convective and/or film cooling requirements increases the ability for designers to better manage local absolute metal temperature distributions, thru wall, and in-plane thermal temperature gradients to decrease local strains throughout the transition section, thereby improving both the local oxidation and thermal mechanical fatigue (TMF) capability of the part design to meet durability life requirements.

Various materials and techniques can be utilized to construct and manufacture the baffles 180, 182. The baffles 180, 182 can be made of a high temperature metal or metal alloy, for example. The baffles 180, 182 can be cast or constructed from sheet metal including portions that are contoured to a predefined geometry. The baffles 180, 182 may also be fabricated using laser powder bed fusion (L-PBF), direct metal laser sintering (DMLS), and/or electron beam melting (EBM) additive manufacturing methods, for example.

The baffle assembly 178 can be assembled as follows. With reference to FIG. 5, the first baffle 180 can be moved in a first direction D1 which can generally correspond to the radial direction R to situate the first baffle body 180A in the internal core cavity 176B. The first baffle 180 is moved in the direction D1 to seat the baffle collar 180J against the standoff collar 185. The baffle collar 180J can be welded, brazed or otherwise mechanically attached to the standoff collar 185.

Thereafter, the second baffle 182 is moved in the direction D1 such that the second baffle 182 extends from the platform section 172 into the internal core cavity 176B. The second baffle 182 can be moved into the direction D1 and brought into abutment with one or more weld lands or standoffs 181 (FIGS. 4 and 5). The standoffs 181 can be a portion of the vane 170 or attached thereto. The second baffle body 182A can be welded, brazed, or otherwise mechanically attached to the standoffs 181 to secure the second baffle 182 in the vane 170. In other examples, the standoffs 181 are incorporated into the second baffle 182.

Referring to FIGS. 4 and 5, the cooling scheme 176 operates as follows. Cooling source 175 supplies cooling flow F to the plenum 174. The cooling flow F is directed through the first cooling passage 184. A portion of the cooling flow F in the first cooling passage 184 can be ejected outward through the film cooling apertures 179 along the transition section 177. The remaining portion of the cooling flow F in the first cooling passage 184 is directed between the baffle collar 180J and second baffle body 182A, which can serve as an inlet to the internal baffle cavity 180D. The arrangement of the second baffle 182 forces substantially an entirety of the cooling flow F from the plenum 174 across the outer periphery surface 182G of the second baffle 182 to provide relatively high local convective heat transfer augmentation and thermal cooling effectiveness to adjacent portions of the transition section 177 with relatively low or minimal pressure drop prior to the cooling flow F entering into the internal baffle cavity 180D.

Cooling flow F in the internal baffle cavity 180D is ejected outward through the film cooling apertures 180G to cool adjacent surfaces of the impingement cavity 183. The first baffle 180 can define apertures 180G adjacent to a terminal end of the internal baffle cavity 180D at the second end portion 180C to provide relatively high heat transfer and prevent or otherwise reduce stagnated flow regions within the internal baffle cavity 180D. The arrangement of baffles 180, 182 can reduce heat pickup of the cooling flow F prior to delivery along a mid-span of the airfoil section 171, which may correspond to relatively higher thermal loads due to hot gases in the gas path GP. Thereafter, the cooling flow F can be ejected from the film cooling apertures 179 along the impingement cavity 183 to provide film cooling to external surfaces of the airfoil section 171. The arrangement of film cooling apertures 179 provide relatively high heat transfer along a midspan of the airfoil section 171, which can be subjected to relatively high heat loads from hot gases in the gas path GP.

Figure 7:
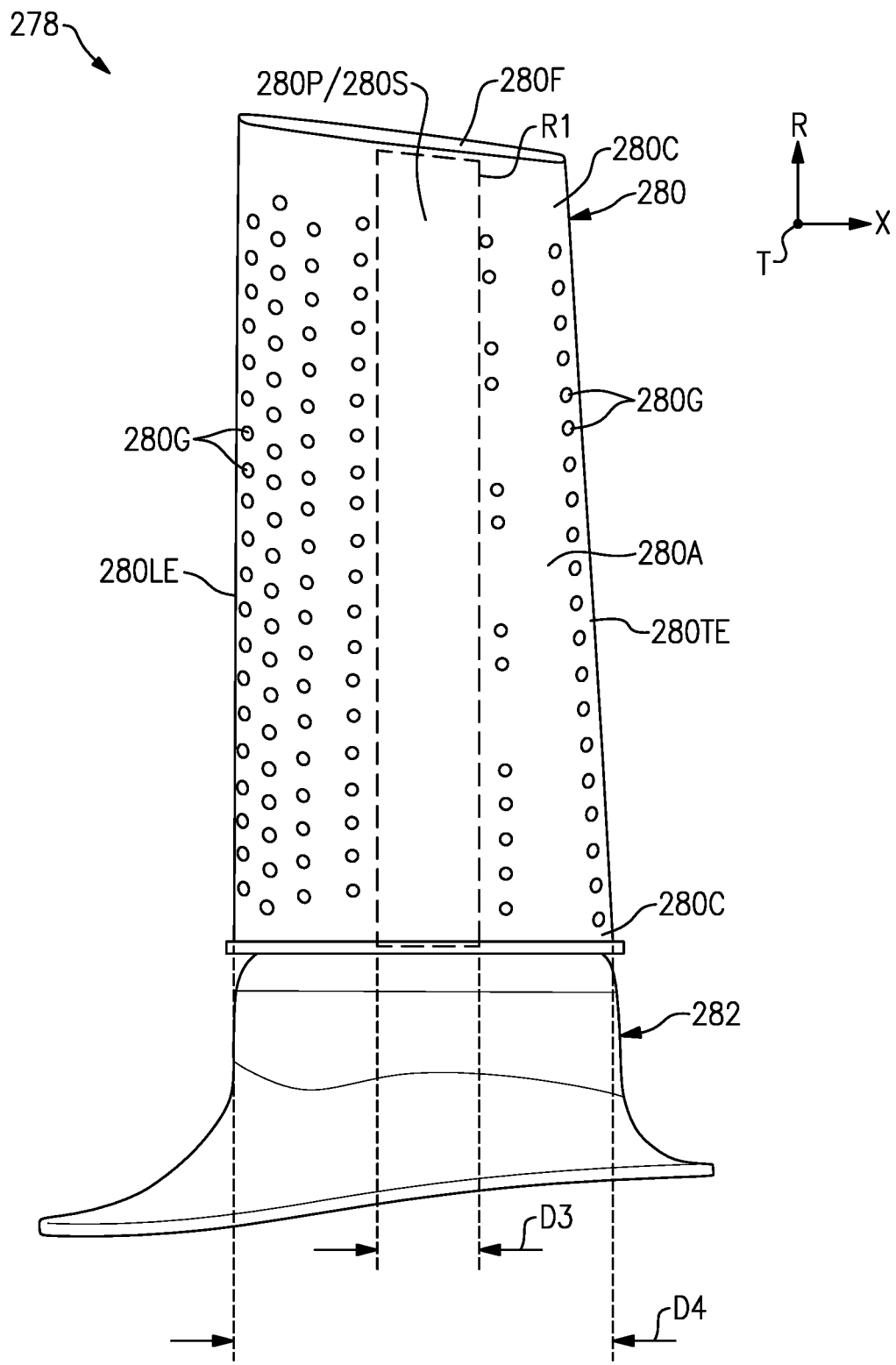
FIG. 7 illustrates a baffle assembly according to another example.

Referring to FIG. 7, a baffle assembly 278 according to another example is disclosed. First baffle 280 defines a plurality of apertures 280G distributed in concentrated regions along the first baffle body 280A to provide concentrated or targeted cooling to localized regions of the impingement cavity (see, e.g., 183 of FIG. 5). For example, the first baffle body 280A may define a relatively greater number or total area of apertures 280G along a leading edge portion 280LE and a relatively lesser number or total area of apertures 280G along a trailing edge portion 280TE. The leading and trailing edge portions 280LE, 280TE can correspond to the leading and trailing edges LE, TE of the respective airfoil section (see, e.g., FIG. 5 at 171).

The first baffle body 280A can define a relative lesser concentration of apertures 280G along pressure and/or suction side surfaces 280P, 280S which can correspond to the pressure and suction side surfaces of the respective airfoil (see, e.g., P, S of FIG. 3). For example, a continuous localized region R1 extending in a radial direction R between first and second end portions 280B, 280C of baffle 280 can be substantially free of any apertures. The localized region R1 can extend a distance D3 in a chordwise direction X between leading and trailing edge portions 280LE, 280TE. Distance D3 may be up to 25% of a distance D4 between the leading and trailing edge portions 280LE, 280TE, for example, to provide concentrated cooling along the leading and trailing edge portions 280LE, 280TE. In further examples, the distance D3 may range between 30% and 80% of the distance D4. In other embodiments, the apertures 280G may be concentrated at mid-span with fewer apertures at the first end, inner diameter (ID), and the second end, outer diameter (OD) of the baffle 280. In other words, the apertures 280G can be concentrated in regions of high heat load and reduced in areas of low heat load.

Figure 8:
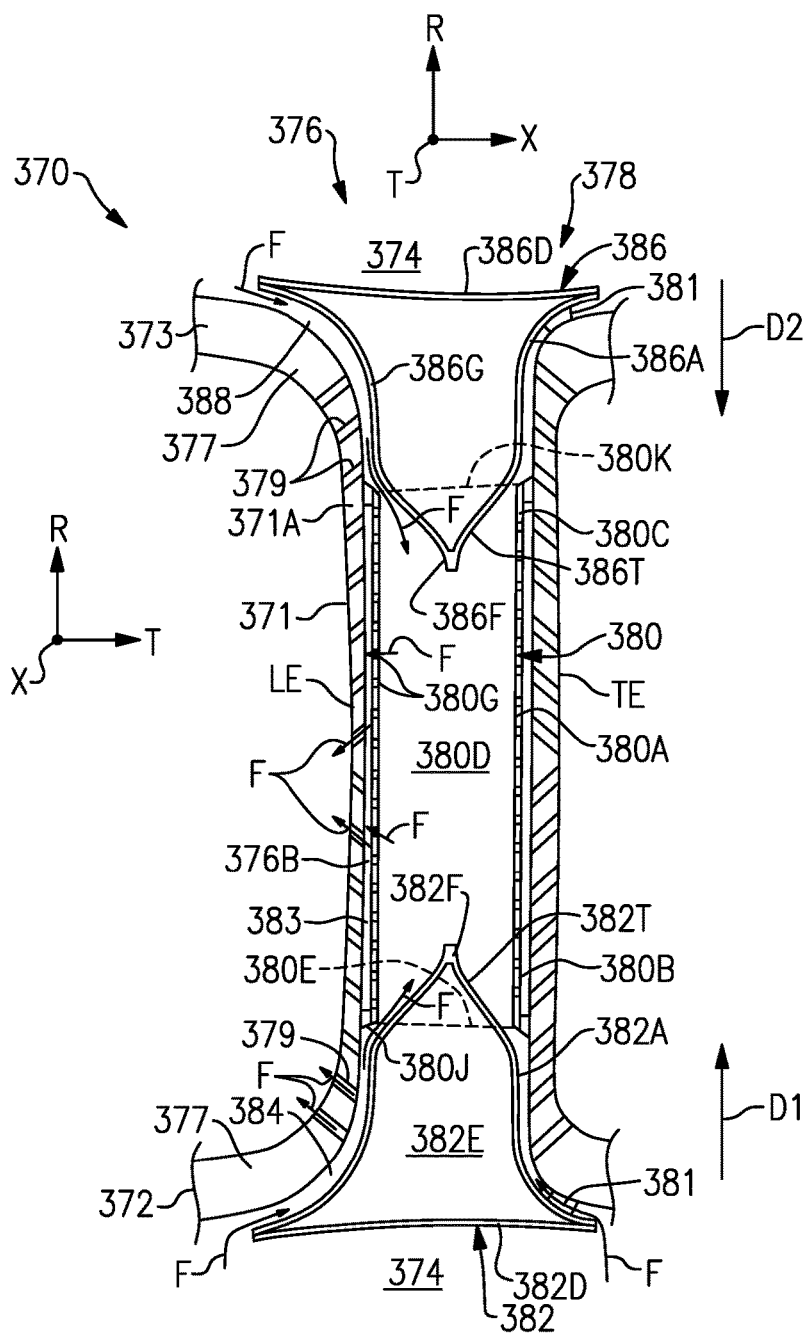
FIG. 8 illustrates a sectional view of a component including a baffle assembly.
Figure 9:
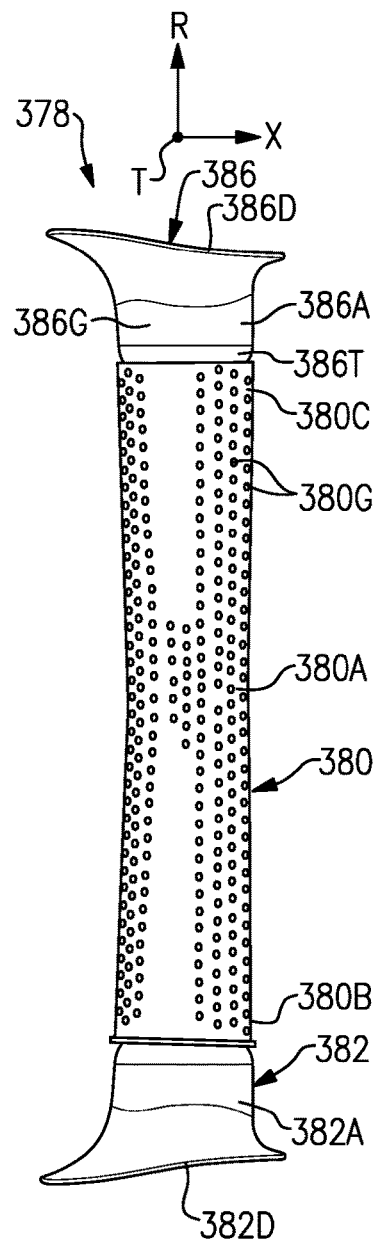
FIG. 9 illustrates an isolated view of the baffle assembly of FIG. 8.

FIGS. 8 and 9 illustrate a baffle assembly 378 according to another example. Baffle assembly 378 includes first and second baffles 380, 382. First baffle 380 includes a first baffle body 380A that extends between opposed first and second end portions 380B, 380C. The first end portion 380B defines a first opening 380E (shown in dashed lines in FIG. 8 for illustrative purposes) that at least partially receives a second baffle body 382A of the second baffle 382. The first baffle body 380A defines a second opening 380K (shown in dashed lines in FIG. 8 for illustrative purposes) that is opposed to the first opening 380E. An internal baffle cavity 380D extends between the first and second openings 380E, 380K, and the second baffle body 382A is dimensioned to extend through the first opening 380E, as illustrated in FIG. 8. The first and second baffles 380, 382 can be constructed and arranged in a similar manner to the baffle assembly 178 of FIGS. 4-6 to establish first cooling passage 384.

The baffle assembly 378 includes a third baffle 386 situated in one of the plenums 374. The third baffle 386 includes a third baffle body 386A and a cover plate 386D. The third baffle 386 can be dimensioned in a similar manner to the second baffle 382 and has a geometry that is contoured with respect to the adjacent portions of the vane 370.

As illustrated by FIG. 8, the third baffle body 386A extends from the second platform section 373 through the second opening 380K and into the internal baffle cavity 380D such that an outer periphery 386G of the third baffle body 386A and external walls 371A of the airfoil section 371 assimilate to define a second cooling passage 388 that directs cooling flow F into the internal baffle cavity 380D.

The third baffle body 386A includes a third tapered portion 386T dimensioned to extend through the second opening 380K and into the internal passage 380D such that an apex 386F of the third tapered portion 382T radially opposes apex 382F of a first tapered portion 382T of the second baffle 382, as illustrated by FIG. 8. Cooling flow F from the respective plenums 374 is directed radially inward along the respective cooling passage 384, 388, into the internal baffle cavity 380D, and then to the impingement cavity 383.

The second baffle 382 can be moved into the direction D1 and brought into abutment with one or more weld lands or standoffs 381 (FIG. 8). The standoffs 381 can be a portion of the vane 370 or attached thereto. The second baffle body 382A can be welded, brazed, or otherwise mechanically attached to the standoffs 381 to secure the second baffle 382 in the vane 370. In other examples, the standoffs 381 are incorporated into the second baffle 382. Similarly, the third baffle 386 can be moved into the direction D2 and brought into abutment with one or more weld lands or standoffs 381 (FIG. 8). The standoffs 381 can be a portion of the vane 370 or attached thereto. The third baffle body 386A can be welded, brazed, or otherwise mechanically attached to the standoffs 381 to secure the third baffle 386 in the vane 370. In other examples, the standoffs 381 are incorporated into the third baffle 386.

Figure 10:
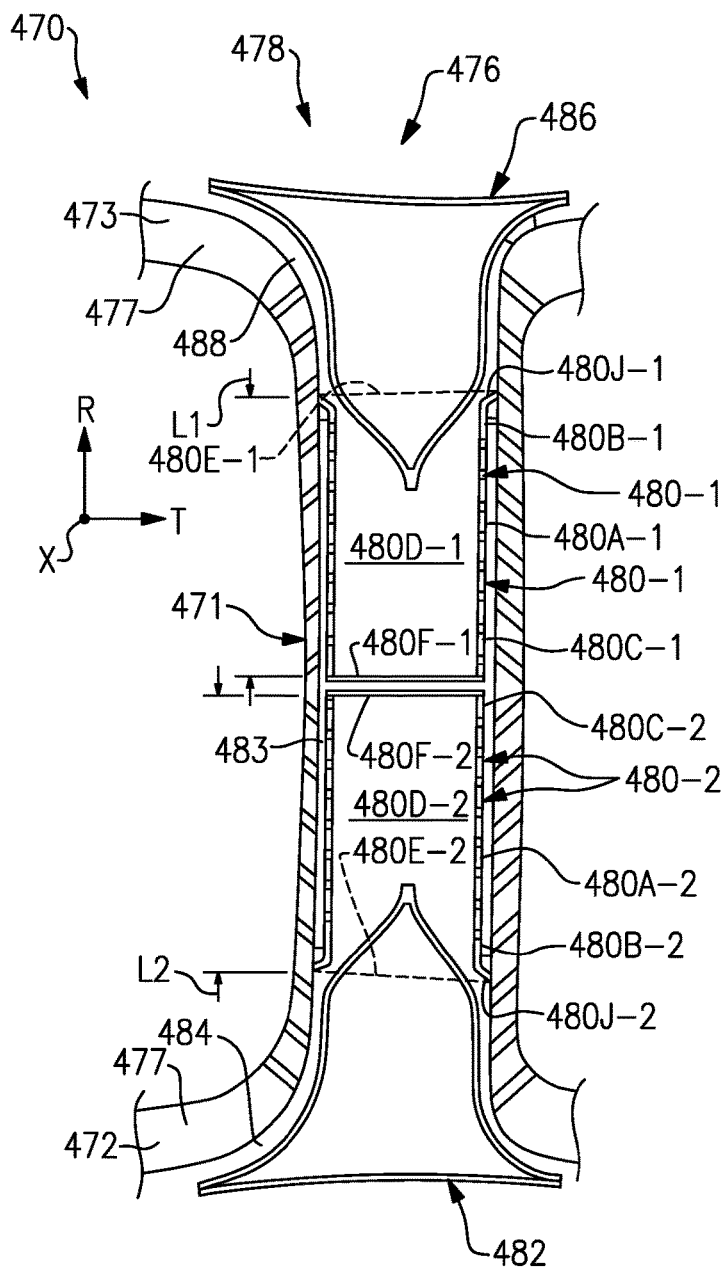
FIG. 10 illustrates a sectional view of a component including a baffle assembly according to another example.
Figure 11:
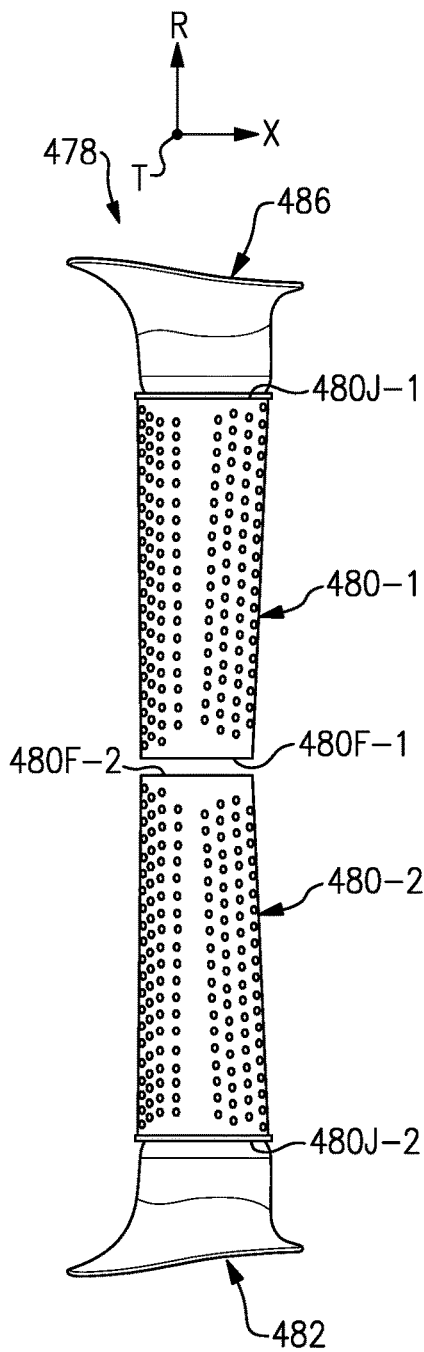
FIG. 11 illustrates an isolated view of the baffle assembly of FIG. 10.

FIGS. 10 and 11 illustrate a baffle assembly 478 according to another example. The baffle assembly 478 includes a pair of radially opposed baffles 480-1, 480-2. Each of the baffles 480-1, 480-2 assimilate or otherwise cooperate with respect to each of the second and third baffles 482, 486 in order to establish cooling scheme 476.

Each of the baffles 480-1, 480-2 include respective baffle bodies 480A-1, 480A-2 that extend from a respective cover plate 480E-1, 480E-2 to a respective opening 480E-1, 480E-2 (shown in dashed lines in FIG. 10 for illustrative purposes). The openings opening 480E-1, 480E-2 are dimensioned to receive respective portions of the second and third baffles 482, 486. Each of the baffles 480-1, 480-2 can be dimensioned to extend a distance in a radial direction R such that each of the baffles 480-1, 480-2 terminates at approximately mid-span of the respective airfoil section 471 such that a first length L1 of the first baffle body 480A-1 and a second length L2 of the baffle body 480A-2 can be substantially equal. In other examples, the baffles 480-1, 480-2 are dimensioned to terminate at another span position such that the first and second lengths L1 differ to provide cooling augmentation to the localized regions of the impingement cavity 483.

Figure 12:
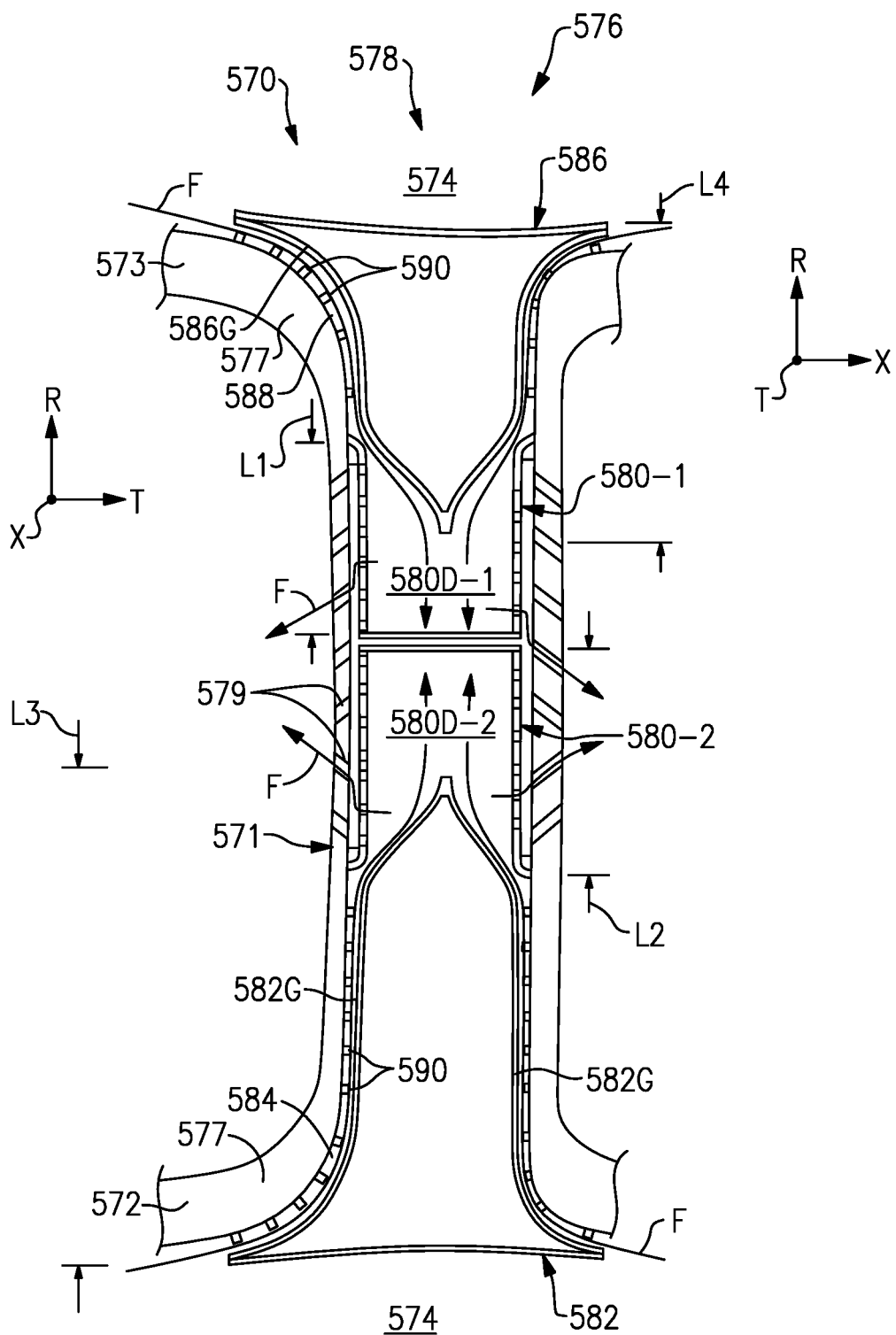
FIG. 12 illustrates a sectional view of a component including a baffle assembly according to yet another example.

FIG. 12 illustrates another example baffle assembly 578 including radially opposed baffles 580-1, 580-2. Baffle 580-1 extends a first length L1, and baffle 580-2 extends a second length L2. The lengths L1, L2 can be the same, or they may differ. Baffle 582 extends in a radial direction R to define a third length L3, and baffle 586 extends in the radial direction R to define a fourth length L4. The second and third baffles 582, 586 can be dimensioned such that the third length L3 differs from (e.g., is greater than) the fourth length L4. The airfoil section 571 can define film cooling apertures 579 in to concentrate cooling flow F at relatively high heat load regions such as a midspan of the airfoil 571. Baffle 582 can be dimensioned to create relatively high internal heat transfer coefficients, which can permit a reduction or elimination of film cooling apertures along the transition section 577.

One or more heat transfer features 590 can extend from walls of the vane 570 along the respective first and second cooling passages 584, 588. The heat transfer features 590 interact with cooling flow F to provide convective cooling augmentation to adjacent portions of the vane 570. At least some or each of the heat transfer features 590 can be spaced apart from an outer periphery surface 582G of the second baffle 582 and an outer periphery 586G of the third baffle 586. Example heat transfer features 590 may include trip strips as shown. Other example heat transfer features include pins, fins, chevrons, raised protrusions, hemispheres and dimples. In other examples, the heat transfer features 590 are defined along the outer periphery surface 582G of the second baffle 582.

Figure 13:
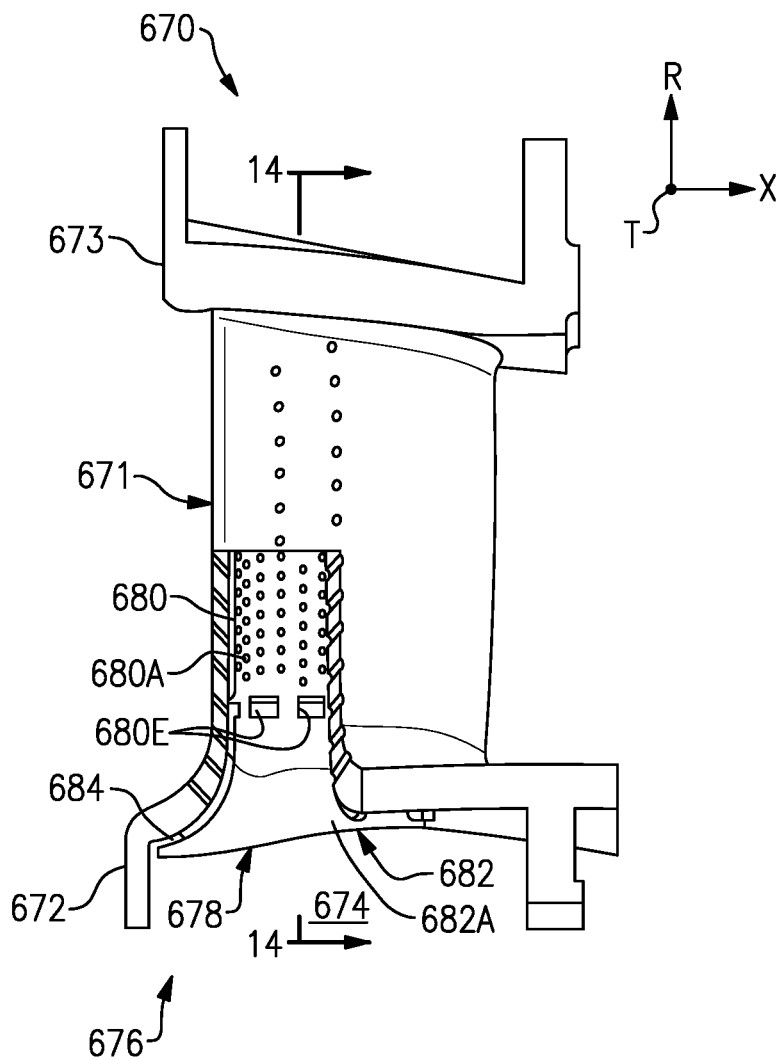
FIG. 13 illustrates a partially cutaway view of a gas turbine component including a baffle assembly according to another example.

FIGS. 13-15 illustrate a baffle assembly 678 according to another example. Baffle assembly 678 includes first and second baffles 680, 682 that are integrally formed as a unitary component, which can reduce complexity in assembly. The baffle assembly 678 includes opposed cover plates 682D and 680F. In the illustrated example of FIG. 14, hollow cavity 682E of the second baffle 682 opens into the internal baffle cavity 680D.

The baffle assembly 678 includes a plurality of openings, apertures, or slots 680E defined in one of the first and second baffle bodies 680A, 682A. The openings 680E can be a plurality of discrete slots and are dimensioned to interconnect first cooling passage 684 and internal baffle cavity 680D of the first baffle 680. Although the slot geometry features shown are an exemplary example, it is to be understood that alternative geometry apertures of differing sizes and shapes may be warranted depending on local cooling flow, pressure loss, and thermal cooling requirements. Other geometry features may include but are not limited to teardrops, elliptical, oval, and/or multifaceted geometries comprising of concave, convex, and linear features used in conjunction with one another and/or independently.

Figure 16:
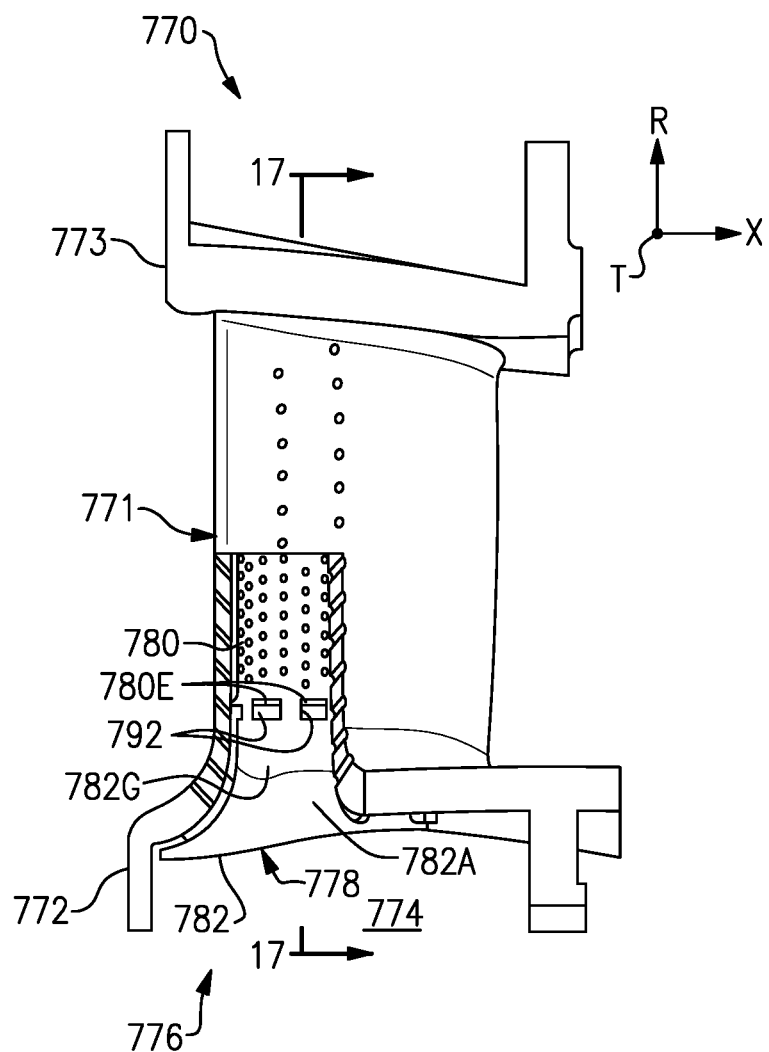
FIG. 16 illustrates a partially cutaway view of a gas turbine component including a baffle assembly according to yet another example.

FIGS. 16-18 illustrate a baffle assembly 778 according to yet another example. The baffle assembly 778 includes a plurality of tabs 792 formed from a portion of second baffle body 782A, for example. The tabs 792 can be bent or otherwise slope inwardly from an outer periphery surface 782G of the second baffle body 782A. The tabs 792 are oriented to direct cooling flow F from openings 780E in a direction away from the second baffle body 782A and toward the internal baffle cavity 780D of the first baffle 780, as illustrated by FIG. 17.

In some examples, second baffle body 782A defines one or more apertures 782H (shown in dashed lines in FIGS. 17-18). The apertures 782H can function as resupply holes that serve as conduit features that enable the communication of a portion of the cooling flow F in first cooling passage 784 to hollow cavity 782E. In addition to purging flow the apertures 782H may also be used to tailor the distribution and/or redistribution of radial and circumferential cooling flow F around the second baffle body 782A in order to optimize and tailor the convective heat transfer and thermal cooling effectiveness in the transition section 777.

Figure 19:
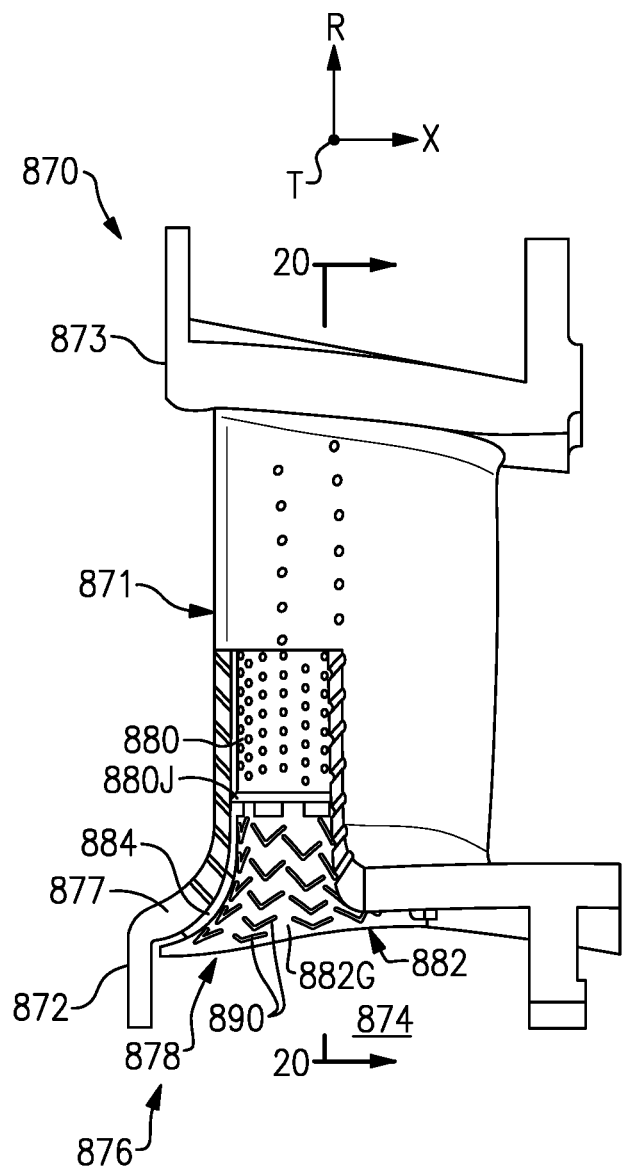
FIG. 19 illustrates a partially cutaway view of a gas turbine component including a baffle assembly according to another example.

FIGS. 19-21 illustrate a baffle assembly 878 according to another example. The baffle assembly 878 includes a plurality of heat transfer features 890 that are defined along an outer periphery surface 882G of the second baffle 882. The heat transfer features 890 can include any of the heat transfer features disclosed herein. In the illustrated example of FIGS. 19-21, the heat transfer features 890 are chevrons that extend outwardly from the outer periphery surface 882G to interact with cooling flow F (FIG. 20) that is communicating along first cooling passage 884. Incorporation of heat transfer features 890 along the outer periphery surface 882G of the second baffle 882 can reduce stresses that may otherwise result by heat transfer features along walls of the airfoil section.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
an airfoil section extending from a first platform section, the airfoil section defining an internal core cavity for conveying a fluid flow;
a baffle assembly including a first baffle and a second baffle;
wherein the first baffle includes a first baffle body extending in the internal core cavity, the first baffle body defining an internal baffle cavity; and
wherein the second baffle includes a second baffle body dimensioned to extend from the platform section into the internal baffle cavity such that an outer periphery surface of the second baffle body and an external wall of the airfoil section cooperate to define a first cooling passage that directs cooling flow into the internal baffle cavity.

2. The airfoil as recited in claim 1, wherein the first baffle is an impingement baffle including a plurality of apertures oriented to eject cooling flow from the internal baffle cavity onto surfaces defining the internal core cavity.

3. The airfoil as recited in claim 2, wherein the first baffle is dimensioned to establish an impingement cavity between the first baffle body and the external wall of the airfoil section, and the external wall defines a plurality of film cooling apertures that extend outwardly from the impingement cavity.

4. The airfoil as recited in claim 3, wherein first baffle body extends from an annular baffle collar dimensioned to establish a sealing relationship along a perimeter of the internal core cavity to fluidly isolate the first cooling passage and the impingement cavity.

5. The airfoil as recited in claim 1, wherein the second baffle body extends between first and second end portions of the second baffle, and the second baffle body tapers from the first end portion to define an apex received in the internal baffle cavity.

6. The airfoil as recited in claim 1, further comprising a transition section interconnecting the external wall of the airfoil section and the first platform section, the transition section defining a plurality of film cooling apertures that extend outwardly from the first cooling passage.

7. The airfoil as recited in claim 1, wherein the second baffle body includes a plurality of heat transfer features along the first cooling passage.

8. The airfoil as recited in claim 1, wherein the airfoil section extends in a radial direction between the first platform section and a second platform section.

9. The airfoil as recited in claim 8, wherein the second baffle is spaced apart from the second platform section, and the first baffle body is at least partially received in the second platform section.

10. The airfoil as recited in claim 8, wherein the internal core cavity extends between opposed first and second openings, the second baffle body extending through the first opening, and further comprising:
a third baffle including a third baffle body that extends from the second platform section, through the second opening and into the internal baffle cavity such that an outer periphery surface of the third baffle body and the external wall of the airfoil section cooperate to define a second cooling passage that directs cooling flow into the internal baffle cavity.

11. A baffle assembly for a gas turbine engine component comprising:
a first baffle including a first baffle body defining an internal baffle cavity that extends between opposed first and second end portions of the first baffle body, the first baffle body defining a plurality of impingement apertures distributed about an outer periphery surface of the first baffle body and defining a first opening along the first end portion, wherein the internal baffle cavity extends between the first opening and a second opening defined in the second end portion;
a second baffle including a second baffle body having a tapered portion that is dimensioned to extend through the first opening and into the internal baffle cavity; and
a third baffle including a third baffle body having a tapered portion that is dimensioned to extend through the second opening and into the internal baffle cavity such that the tapered portion of the third baffle body opposes the tapered portion of the second baffle body.

12. The baffle assembly as recited in claim 11, wherein the first baffle body is dimensioned to establish an impingement cavity between the outer periphery surface of the first baffle body and an external wall of an airfoil section of an airfoil, and the second baffle body is dimensioned to establish a first cooling passage between the outer periphery surface of the second baffle body and a fillet portion between the airfoil section and a platform section.

13. A gas turbine engine comprising:
a rotatable blade spaced axially from a vane; and
wherein at least one of the blade and the vane includes an airfoil section extending from a first platform section and includes a baffle assembly, the airfoil section defining an internal core cavity for conveying a fluid flow, the baffle assembly comprising:
a first baffle including a first baffle body extending in the internal core cavity, the first baffle body defining an internal baffle cavity;
an annular collar extending about an outer periphery surface of the first baffle body; and
a second baffle including a second baffle body dimensioned to extend from the platform section into the airfoil section such that an outer periphery surface of the second baffle body and an external wall of the airfoil section cooperate to define a first cooling passage that directs cooling flow along the collar and into the internal baffle cavity.

14. The gas turbine engine as recited in claim 13, wherein the first baffle is dimensioned to establish an impingement cavity between the first baffle body and the external wall of the airfoil section, and the first baffle body defining a plurality of apertures about the outer periphery surface of the first baffle body that interconnect the internal baffle cavity and the impingement cavity.

15. The gas turbine engine as recited in claim 14, wherein the collar is dimensioned to extend between the external wall and the first baffle body to fluidly isolate the first cooling passage and the impingement cavity.

16. The gas turbine engine as recited in claim 13, wherein the first and second baffles are separate and distinct components, and the second baffle body is dimensioned to extend from the platform section into the internal baffle cavity.

17. The gas turbine engine as recited in claim 13, further comprising a plurality of slots defined between the first and second baffle bodies that interconnect the first cooling passage and the internal baffle cavity.

18. The gas turbine engine as recited in claim 17, further comprising a plurality of tabs sloping inwardly from the outer periphery surface of the second baffle body such that the tabs are oriented to direct cooling flow from the slots in a direction away from the second baffle body and toward the internal baffle cavity.

19. The gas turbine engine as recited in claim 13, further comprising a fillet portion interconnecting the external wall of the airfoil section and the first platform section, the fillet portion defining a plurality of film cooling apertures that extend outwardly from the first cooling passage.

20. The gas turbine engine as recited in claim 14, wherein the second baffle body extends between first and second end portions of the second baffle, and the second baffle body tapers from the first end portion to define an apex received in the internal baffle cavity.

* * * * *